Patented Jan. 1, 1952

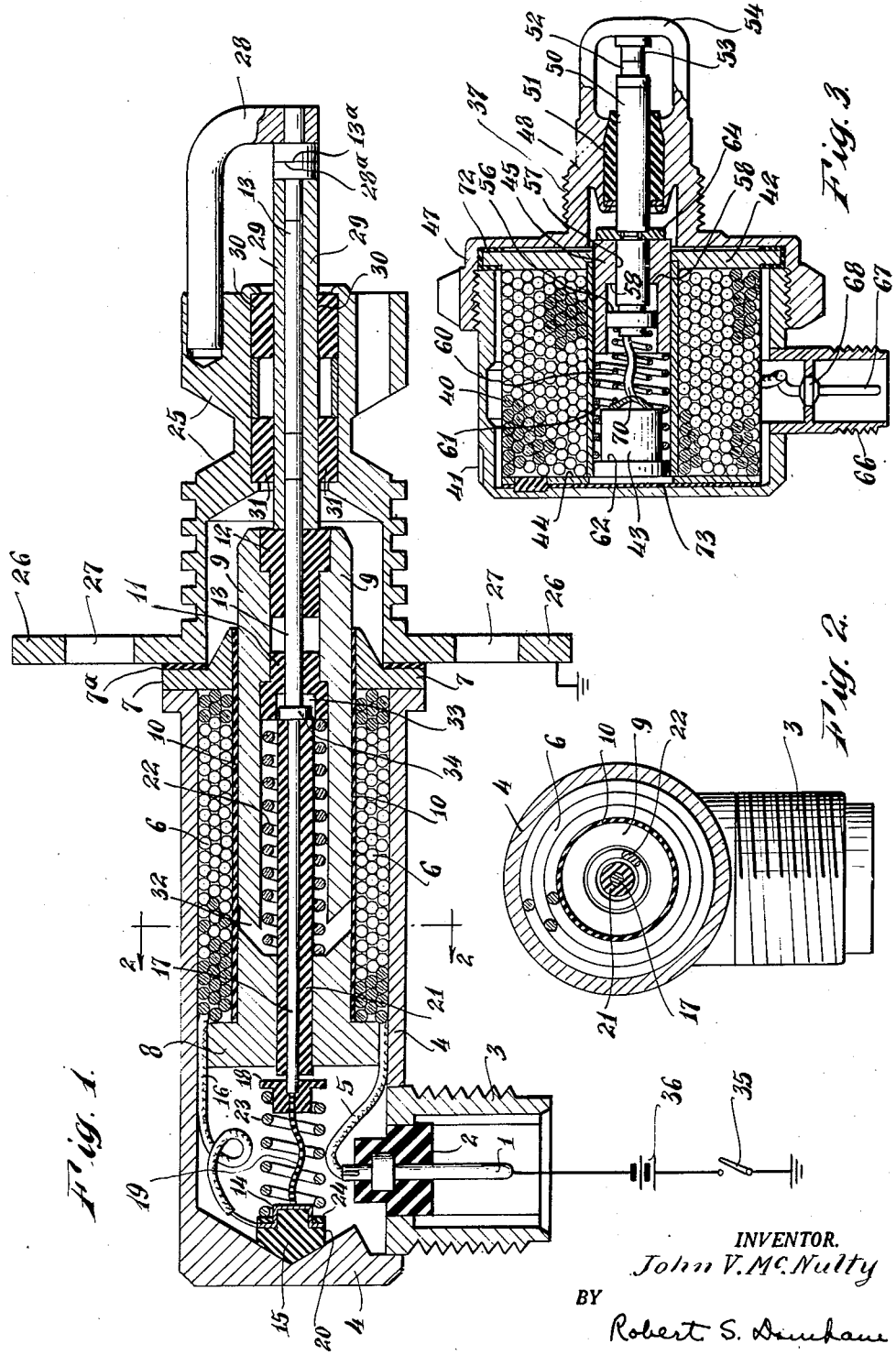

2,580,689

UNITED STATES PATENT OFFICE 2,580,689

MAGNETICALLY FIRED IGNITION DEVICE

John V. McNulty, Norwich, N. Y., assignor to General Laboratory Associates, Inc., Norwich, N. Y., a corporation of New York Application November 16, 1948, Serial No. 60,262

3 Claims. (Cl. 123—154)

This invention relates to a spark ignition device and more particularly to a spark ignition device for direct expansion type engines, e. g. so-called jet engines.

The advent of extensive use of direct expansion type engines has introduced many new problems as compared to those faced with the conventional reciprocating type internal combustion engines. Aside from the differences in mechanical structure, one important difference is that the direct expansion engine sometimes utilizes fuels of lower grades and lesser volatility and consequently requires a higher energy spark for ignition. Also, in direct expansion type engines, after initial ignition there is no need for recurring ignition, as the fuel is fed directly into a combustion chamber which is at all times under a state of ignition. Since lower grade fuels and fuels of lesser volatility are sometimes used, it is necessary to impart greater energy to the spark, in order that ignition may be readily accomplished. A purpose of this invention, therefore, is to provide an ignition device that will provide a suitable spark for ignition of said lower grade fuels and, in which the energy provided at the spark gap is substantially greater than that provided in the conventional ignition systems.

The use of lower grade fuels leads to other difficulties. A greater amount of carbon and waste products are deposited in the combustion chamber and on the ignition device after ignition, which will rapidly foul conventional spark ignition devices and render them less efficient or inoperative for subsequent ignitions. A further purpose of this invention, therefore, is to provide a spark ignition device that will be relatively impervious to carbon deposits on the electrodes as a determinant of efficient operation, and in addition to provide a device which will keep said carbon deposits to a minimum.

The conventional ignition devices as used in reciprocating type internal combustion engines must, of necessity, have a timing system to regulate the order of firing. In a direct expansion type engine there is no need for a cumbersome timing system, as once the fuel is ignited, it will stay ignited until the supply of fuel is either exhausted or shut off. A further object of this invention, therefore, is to provide an entirely self-timed ignition system, eliminating the need for a cumbrous timing system, and to provide for manual control of the actuation of said ignition system.

Since greater energy is needed at the electrodes to ignite the lower grade fuels and fuels of lesser volatility utilized in direct expansion type engines, it is usually necessary to work at higher voltages than would normally be utilized in reciprocating type internal combustion engines. This use of high voltages adds many problems with respect to insulation, which in turn, adds to the difficulty of construction. A further object of this invention, therefore, is to provide a suitable low voltage system which will provide sufficient energy at the electrodes to ignite the fuel, thus reducing insulation problems to a minimum.

The advent of direct expansion type engines as a primary source of power for aircraft has greatly increased the altitude range of the standard types of aircraft. The changes in altitude and the variations in density of the atmosphere accompanying the same, cause variations in breakdown voltage and flashover between undesired points. The normal ignition system is therefore subject to inherent troubles at high altitudes, and will not function at a high peak of efficiency. A further object of this invention, therefore, is to provide a spark ignition system that will work at a high degree of efficiency at all altitudes.

In addition to considerations of altitude and type of fuel, a number of other factors contribute to make the ignition requirements of direct expansion engines different from those of the conventional reciprocating type. These other factors include temperature, air velocity, ram pressure, and fuel ratio; when they are considered along with the matters already mentioned, it has been found that a higher spark energy is required to effect ignition in engines of this type as contrasted with ordinary reciprocating engines. The present invention is therefore designed to satisfy these requirements, in a particularly reliable manner; indeed the reliability and sureness of operation of the present ignition device are very important because of so-called blow-outs, i. e. extinguishment of combustion, that are apt to take place in present types of jet engines and the like. With sustained burning achieved only under favorable conditions, it is often necessary to re-ignite the fuel while the aircraft, for example, is in flight. The present device responds promptly and effectively, by a simple circuit-closing operation, to provide such re-ignition at any desired time.

A common failing of standard spark ignition devices is pitting or erosion of the electrodes caused by sparking at a high repetition rate, resulting in a consequent heating of the electrode. This heating of the electrodes might be sufficient to cause the electrodes to glow, and this consequent high temperature of the electrodes together with the impurities present in lower grade fuels has led to a very short life for the standard type electrodes and sparking device as used in the conventional direct expansion type engine. A further object of this invention, therefore, is to provide a spark of low repetition rate with a consequent reduction of electrode temperature and the consequent longer life of said electrodes.

Referring now to the drawings:

Fig. 1 is a longitudinal section of one embodiment of the complete ignition device;

Fig. 2 is a transverse section on the line 2—2 of Fig. 1; and

Fig. 3 is a longitudinal section of another and presently preferred embodiment of the invention.

The invention may be identified as an improved ignition device for direct expansion type engines, and may be generally described as a "break spark" igniter, wherein current is caused to flow through the windings of a solenoid, building up a strong magnetic field. The current path is then automatically broken due to the action of said magnetic field and the energy stored therein is dissipated in the form of an arc at the electrodes.

In Figs. 1 and 2 the electrical input terminal 1 is mounted in an insulating member 2 in a socket 3, which is, in turn, mounted in the upper cylindrical metallic housing 4, which is constructed of a metal of high permeability such as soft iron. The input terminal 1 is electrically connected to the windings of a solenoid 6 by an insulated lead 5 of suitable conducting material.

The solenoid winding 6 is concentrically mounted within said cylindrical housing 4 and is securely held in position by a fixed collar 7 and a fixed bushing 8, both constructed of a suitable metallic material having a high permeability. The shaft of said bushing 8 extends into and forms a part of the core of said solenoid 6. The entire core of said solenoid winding 6 consists of a fixed element and a movable element. The fixed element consists of the shaft of said bushing 8 and does not move with respect to the solenoid 6. The movable element comprises a tubular metallic shaft 9 of high permeability, separated from said solenoid 6 by a fixed layer of insulating material 10. Said core or shaft 9 is adapted to move in a direction parallel to the axis of said solenoid winding 6 and is normally held in the extended position, as shown in Fig. 1, by the spring 22. The spring 22, under compression, is mounted at one end on the shaft of the bushing 8, and is mounted on the other end on the bushing 11. The latter is one of a pair of bushings 11, 12 made of suitable insulating material, which are mounted concentrically within said tubular shaft 9 and serve as a mounting or sliding support for the shaft of the movable electrode 13. The normal position of the tubular shaft 9 is disposed to create a gap 32 between the end of said shaft 9 and the end of the shaft of the bushing 8. By way of example, for one type of device having the specific structure shown, tests have demonstrated that a gap of the order of .120 inches leads to satisfactory results.

The other terminal of the solenoid winding is electrically connected to the conducting cap 14 of the terminal block 20, mounted on the internal side of the annular section of said upper cylindrical housing 4, by an insulated lead 16. The terminal block 20 consists of an insulating member 15 upon which is mounted said conducting cap 14. The electrode connecting rod 17, composed of suitable conducting material is electrically connected to said conducting cap 14 by an insulated lead 19. Thus through the above series of connections the electrode connecting rod 17 is electrically connected with the second terminal of the solenoid winding 6. The electrode connecting rod 17 is contained axially within a sleeve 21 made of suitable insulating material, and the assembly of the connecting rod 17 and insulating sleeve 21 is movably mounted axially within said bushing 8 forming the fixed part of the core of the solenoid 6. The movable electrode connecting rod 17 contacts at one end the movable electrode 13 and terminates at the other end, in an insulated bushing 18. A compression spring 23, mounted at one end on an insulating bushing 24 which the conducting cap 14 of the terminal block 20 carries, and mounted at the other end on the insulating bushing 18, keeps the electrode connecting rod 17 in firm contact with the movable electrode 13. thus providing a direct electrical connection between said connecting rod 17 and the movable electrode 13. Thus it is seen that there has been provided a direct electrical connection from the input terminal 1, through the solenoid 6, through the electrode connecting rod 17 to the movable electrode 13.

The movable electrode 13 extends beyond the movable tubular shaft 9 forming part of the core of the solenoid 6 and extends through the lower cylindrical housing 25. The lower housing 25 in the preferred form of the invention as shown in the drawings, has a pair of flanges 26, having apertures 27 drilled therein adaptable as a mounting unit in a direct expansion type engine. The lower section of said lower housing 25 serves as a mounting for the fixed electrode 28 and as a ground for the entire device. The lower housing 25 is insulated from the cylindrical housing 4 by the insulating member 7A. The lower section of the movable electrode 13 is contained axially within a sleeve 29 movable in conjunction with said movable electrode 13. Said sleeve 29 and the movable electrode 13 contained axially within said sleeve 29 are mounted to slide in bushings 30, 31 composed of suitable heat-resistant, electrical insulating material and being fixed in position with respect to said lower housing 25.

The invention is adapted to operate with either an alternating current or direct current source of power. For the purposes of example herein, however, the operation will be considered as if with a direct current source of power. The positive terminal of a battery 36 is directly connected to the input terminal 1 and the negative terminal of said battery 36 is connected through a switch 35 to the fixed electrode 28, either directly or through ground where the electrode 28 is, as shown, grounded and is at ground potential. As the switch 35 is closed applying voltage to the circuit, current will flow through a circuit comprising the input terminal 1, through the lead 5, through the winding of the solenoid 6, through the lead 16, through the conducting cap 14, through the lead 19, through the electrode connecting rod 17, through the movable electrode 13 to the fixed electrode 28 which is mounted on the lower base 25 and is at ground potential.

As the switch 35 is closed the current initially will have a zero value and the current will gradually build up to its peak value as determined by the circuit constants. As the current builds up in its passage through the solenoid winding 6, a magnetic field will be set up by the changing current. The flux path of this magnetic field will be through the housing 4, the bushing 8, the movable shaft 9 and the collar 7, all made of metal of high permeability. This flux will cause the movable shaft 9 to move towards the bushing 8, tending to close the gap 32. This movement is continually resisted by the spring 22 which is disposed to prevent the movement of the shaft 9 until a magnetic field of sufficient strength to overcome the tension of the spring 22 has been built up. As the flux reaches a sufficient strength to move said tubular shaft 9 by overcoming the tension of the spring 22, said tubular shaft 9 together with the bushings 11, 12 will move as a unit. The bushing 11 has an annular receptacle 33 recessed therein and adapted to contain a flange 34, mounted on the movable electrode 13 at the extremity of said electrode 13. The annular receptacle 33 is adapted to permit the movement of the shaft 9 and the bushing 11, 12 through a slight distance before contacting the flange 34 and causing the movable electrode 13 to move.

As the movable tubular shaft 9 together with the bushings 11 and 12 moves in a direction to close the gap 32, the annular receptacle will move towards the flanged section 34. When the base of said annular receptacle 33 contacts the flange 34 on the movable electrode 13, the current in the solenoid and the resulting magnetic field have built up quite considerably, indeed preferably to or near the maximum. The tubular core or shaft 9 has also now acquired considerable momentum, and for that reason and because of the strong field acting on it, is well adapted to overcome the force of both the springs 22, 23. In consequence as the base of the recess 33 strikes the flange 34 on the electrode 13, the latter assembly, together with the electrode connecting rod 17, is moved smartly along with the core member 9. In other words, the electrode 13 is now moved by the core member away from the fixed electrode 28, breaking the contact between them: the momentum of the core member is indeed preferably sufficient to open a gap of desirably substantial extent between the faces of the electrodes 13a, 28a. When the movable electrode 13 thus moves out of contact from the fixed electrode 28 (separating their faces, as stated) the energizing or charging circuit as described above is broken, and the current flow through said circuit is interrupted. This interruption of current flow causes the magnetic field which had previously been built up to collapse. The collapse of said magnetic field causes the current to attempt to flow in the interrupted circuit. In consequence, current will flow in said circuit, immediately causing an arc or spark to be formed across the gap between the movable electrode 13 and the fixed electrode 28 as the energy available in the collapsing magnetic field is dissipated.

After the energy available in the magnetic field has been dissipated in the form of an arc between the movable electrode 13 and the fixed electrode 28, the electrodes will again contact each other under the pressure of the spring 22 and the spring 23. When the movable electrode 13 contacts the fixed electrode 28, the charging circuit will again be completed, current will flow causing a new magnetic field to build up and the above-described cycle will repeat itself. The device will repeat the cycle as long as the switch 35 is closed.

The delay in opening the gap between the fixed electrode 28 and the movable electrode 13 serves to permit a greater magnetic field strength to be built up, with a consequently greater energy content in the resulting arc, and also serves to permit the tubular shaft 9 to gain enough momentum to provide a wider gap before and during the arc-over. It will be understood that if the contacts open as soon as the core starts to move under the influence of the magnetic field, the energizing current, and thus the field itself, may not have risen beyond a value far short of saturation; whereas with the present construction, the curent and field strength may in effect reach a maximum before the delayed contact opening takes place. The opening and closing of the gap between the electrodes at a rate determined by the repetition rate of the above described cycle aids in the shaking loose of any carbon or other deposits on the contact surfaces of the electrodes with a consequent increase of efficiency.

The arc-over normally occurs after the movable electrode 13 breaks its contact with the fixed electrode 28 and is moving away from said fixed electrode 28. The exact point at which the firing will take place is a function of the magnetic field strength, the dielectric constant of the medium present in the gap between the electrodes, and the spacing of the electrodes. Assuming the magnetic field strength to be constant (which it is for all practical purposes), the point at which the spark will jump the gap is determined by the distance between the electrodes and the dielectric constant of the medium. Since the dielectric constant will vary with the altitude of the device, the moving electrode 13 will pass, at some point in its movement, through the optimum point for arcing. Thus the invention will provide a satistory spark at any altitude.

By way of specific example, with an arrangement as shown in Figs. 1 and 2, very satisfactory results have been obtained by utilizing a gap spacing of approximately .120 inch for the gap 32 between the tubular shaft 9 and the bushing 8, and a spacing of approximately .040 inch for the gap between the base of the annular receptacle 33 on the bushing 11 and the flange 34 on the movable electrode 13.

Fig. 3 shows another and presently preferred embodiment of the invention, which involves a simplified structure, easy to manufacture at low cost and yet highly efficient in the attainment of the desired results. The device is shown in vertical section through its horizontal axis, viz. the axis of the solenoid winding 40, corresponding to the winding 6 of Fig. 1. The winding is surrounded by core structure including a cup-shaped cylindrical housing 41, a forward wall 42 and a stud-like core member 43 projecting into the central opening of the solenoid winding, from an inner plate 44 that is disposed adjacent the rear wall of the housing 41. A horizontally slidable sleeve 45 extends through a central opening in the front wall 42, so as to constitute further core structure approaching the stud 43, but spaced from it in the manner of the tubular member 9 of Fig. 1 relative to the bushing 8. The members 41 to 45 inclusive constitute the core or magnetic circuit of the solenoid and are conveniently made of soft iron or other suitable material of high permeability.

A shallow-cup-shaped mounting plate 47 encases the forward end of the housed structure 41—42 and carries a projecting tubular portion 48 aligned with the central opening of the solenoid winding and the members 43, 45. An electrode mounting rod 50 is disposed within the tubular portion 48, being adapted to slide in a horizontal direction, along the central axis of the device through a sleeve 51 of insulating material, preferably a refractory or like substance having good resistance to deterioration at very high temperatures.

At its outer extremity the rod 50 carries one spark electrode 52 adapted to abut the other spark electrode 53 mounted on the inner surface of a bail or arm 54 which projects from the tubular portion 48. It will be appreciated that the spark electrodes 52, 53 are shown in contact and are adapted to be broken, i. e. to produce a spark, when the rod 50 moves longitudinally away, viz. to the left as seen in Fig. 3. At its opposite or inner end the rod 50 carries an enlarged head or disc 56, sliding in a corresponding cylindrical recess in the member 45, the rod 50 itself traversing an opening 57 (in the member 45) of less diameter, and the structure of the member 45 thus providing a shoulder 58 facing the disc 56, but normally spaced from it as shown.

A coil spring 60 disposed, under compression, between the ends of the stud 43 and the head 56 of the electrode rod, normally keeps the electrodes 52, 53 closed. Another coil spring 61, conveniently surrounding the spring 60 and a reduced portion of the stud 43 as shown, extends under compression between the inner end of the sleeve 45 and a cooperating shoulder 62 on the stud 43. The spring 61 serves to keep the sleeve or tubular core member 45 in its normal, outer position, where it rests against a flange 64 carried by the electrode rod 50.

The electrical connections of the several elements in the device of Fig. 3 are functionally the same as in Fig. 2, i. e. the solenoid winding 40 and the electrodes 52, 53 being connected in series across the terminals of the device, which consist of a grounded sleeve 66 and a central pin 67 surrounded by the sleeve but mounted in an insulating bushing 68. More specifically, one terminal of the winding 40 is connected to the pin 67, the other terminal of the winding being connected to the stud 43 and thence via a flexible lead 70 to the metal electrode rod 50 which terminates in the electrode 52. The other electrode 53 is connected through the metallic housing and mounting structure 48, 47, and the housing 41, to the grounded sleeve 66.

To facilitate connections and afford an economy of parts, the forward plate 42 of the solenoid core structure is insulated from both the housing 41 and the mounting cup 47 by a channel-shaped ring 72 of insulating material around the circular periphery of the plate. The outer flange of the ring 72 also serves to space the plate 42 from the web of the cup 47. Thus in cooperation with the insulating sleeve 51, the entire reciprocating assembly, along with the plate 42, is insulated from the grounded housing structure. The supplemental plate 44 is likewise insulated from the rear wall of the housing 41 by a layer 73 of insulating material, so that the stud 43 and the springs 60, 61, which are in electrical contact with the reciprocating elements, are similarly insulated from the housing. It will be appreciated that the insulating members 72, 73 do not interfere appreciably with the magnetic flux in the solenoid core, but afford a simplicity of structure while permitting the use of a continuously metallic outer housing which may be mounted at ground potential.

It will now be appreciated that the mode of operation of the apparatus of Fig. 3 is essentially identical with that of Figs. 1 and 2. Upon closing the circuit connecting a source of current (not shown) to the terminal 66, 67, the solenoid winding is energized, building up metallic flux in its core. The sleeve or tubular member 45 is thus caused to move inwardly, i. e. to the left as seen, in an attempt to close the gap between it and the stud 43, the force being sufficient to overcome that of the spring 61. After the member 45 has travelled a distance equal to that between the head 56 and shoulder 58, the latter engages the head so that continuing travel of the member 57 then pulls the electrode rod 50 to the left, opening the electrodes 52, 53. Since by this time the flux in the magnetic circuit has built up near or to a maximum, interruption of the circuit causes a spark of correspondingly high energy to pass between the electrodes. After the magnetically stored energy has thus been dissipated in the spark (or arc), the latter interrupts itself and the parts return to their original position under the force of the springs 60, 61. The cycle of operations is then automatically repeated, and will continue to be repeated so long as the energizing circuit (cf. Fig. 1) connected to the terminals 66, 67 remains closed. It will be seen that the device of Fig. 3 provides the same delayed opening of the electrodes, with the same high energy of spark, as described in connection with Fig. 1, thus affording a peculiarly satisfactory ignition device for engines of the jet or direct expansion type. At the same time, the device of Fig. 3 is compact and is characterized by an advantageous simplicity of structure and economy of parts. It will be understood that in operation the mounting member 37 provides appropriate fastening to the wall of the engine chamber, into which the tubular portion 48 projects, for exposure of the electrodes 52, 53 within the chamber.

In accordance with the provisions of the patent statutes, I have herein described the principle of operation of this invention, together with the elements which I now consider the best embodiments thereof, but I desire to have it understood that the structure disclosed is only illustrative and the invention can be carried out by other means. Also, while it is designed to use the various features and elements in the combinations and relations described, some of these may be altered and modified without interfering with the more general results outlined as coming within the scope of the invention.

I claim:

1. A sparking device comprising a solenoid having an axial core opening, a movable, tubular core member comprising magnetic material and extending along the axis of the solenoid and into the opening from one end of the latter, said core member having its inner end normally within the solenoid and being adapted to be attracted further into the solenoid, a fixed core member of magnetic material extending into the opening of the solenoid from the other end of the latter, said core members being disposed to provide an air gap between their inner ends inside the solenoid opening when the movable core member is in its aforesaid normal position, a fixed spark electrode mounted outside the solenoid and beyond the outer end of the movable core member, a movable spark electrode normally disposed in contact with the fixed electrode and having an operating rod extending from said movable electrode into said movable, tubular core member, means for resiliently urging said movable electrode against said fixed electrode, said rod having an enlarged portion within the tubular core member and the tubular core member having internal shoulder means adapted to engage said enlarged portion, said shoulder means being spaced from the enlarged portion, when the tubular core member is in its said normal position, by a distance shorter than said gap, so that upon inward magnetic attraction of the movable core member inside the solenoid opening toward the fixed core member, the movable core member and its shoulder means first travel said distance and then the shoulder means engages the enlarged portion of the rod to separate the movable electrode from the fixed electrode.

2. A sparking device as described in claim 1, which includes metallic housing structure at one end of the solenoid, supporting said fixed electrode and slidably supporting said rod at a locality beyond the outer end of the movable core member, a metallic housing including portions of magnetic material to provide corresponding portions of an external flux path around the outside of the solenoid between the core members, said second housing surrounding the solenoid and cooperating with the first housing structure to provide a complete enclosure for the solenoid and the fixed and movable core members, and means including insulating material, for electrically insulating the aforesaid rod and movable electrode from both the aforesaid first housing structure and the second housing.

3. A sparking device as described in claim 2, in which the second housing includes a cylindrical portion of magnetic material surrounding the outer sides of the solenoid, the device including plate members of magnetic material at the respective ends of the solenoid for completing flux paths between the said cylindrical portion and the core members, and said insulating means comprising an insulating sleeve around the rod separating the latter from the first housing structure and thin members of insulating material disposed to separate the aforesaid plate members from the first housing structure and second housing.

JOHN V. McNULTY.

REFERENCES CITED

The following references are of record in the file of this patent:

UNITED STATES PATENTS

| Number | Name | Date |
|---|---|---|
| 883,554 | Maillard | Mar. 31, 1908 |
| 908,906 | Torrens | Jan. 5, 1909 |
| 972,798 | Baehr | Oct. 18, 1910 |
| 1,263,005 | Truesdell | Apr. 16, 1918 |
| 1,339,429 | Truesdell | May 11, 1920 |